United States Patent [19]

Isakson et al.

[11] 4,026,159

[45] May 31, 1977

[54] FLUIDIC ANGULAR RATE SENSOR NULL ERROR COMPENSATION

[75] Inventors: Donald H. Isakson, West Hartford; Joseph P. Hu, Easton; Max A. Schaffer, Fairfield, all of Conn.

[73] Assignee: United Technologies Corporation, Hartford, Conn.

[22] Filed: Feb. 23, 1976

[21] Appl. No.: 660,961

[52] U.S. Cl. .......................................... 73/516 LM
[51] Int. Cl.² .......................................... G01P 15/08
[58] Field of Search ........... 73/516 LM, 516 R, 1 D

[56] References Cited

UNITED STATES PATENTS 3,631,729  1/1972  Moore .......................... 73/516 LM

*Primary Examiner*—James J. Gill
*Attorney, Agent, or Firm*—M. P. Williams

[57] ABSTRACT

In a fluidic angular rate sensor in which a pair of temperature sensitive resistive elements are differentially cooled by a jet of fluid, the direction of which lags the position of the resistive elements when the rate sensor is rotated in the plane of sensitivity, undesired, long term errors that result in the lack of a zero null (when the unit is not undergoing any angular rate) are compensated for by introducing a voltage equal to the zero-rate null offset, determined with the velocity of the fluid jet reduced to a point below which it has any appreciable effect on the sensing bridge (simulating static conditions), together with an input to the bridge to offset its output so that the static null offset to be usable to compensate the dynamic null offset (that is, the offset in the null determined with the fluid jet in full operation). In one embodiment, the bridge is offset during the static null error determination, thereby to offset the stored, null error; in another embodiment, the bridge is offset during operation, but not during the static null determination, so the offset and the static null error together compensate for the dynamic null error. The fluid jet may simply be reduced, and not completely stopped, thereby to avoid static laminar conditions and pressure differentials in the static fluid resulting from accelerations; or, the fluid jet may be completely eliminated during the compensating null voltage generation procedure.

9 Claims, 3 Drawing Figures

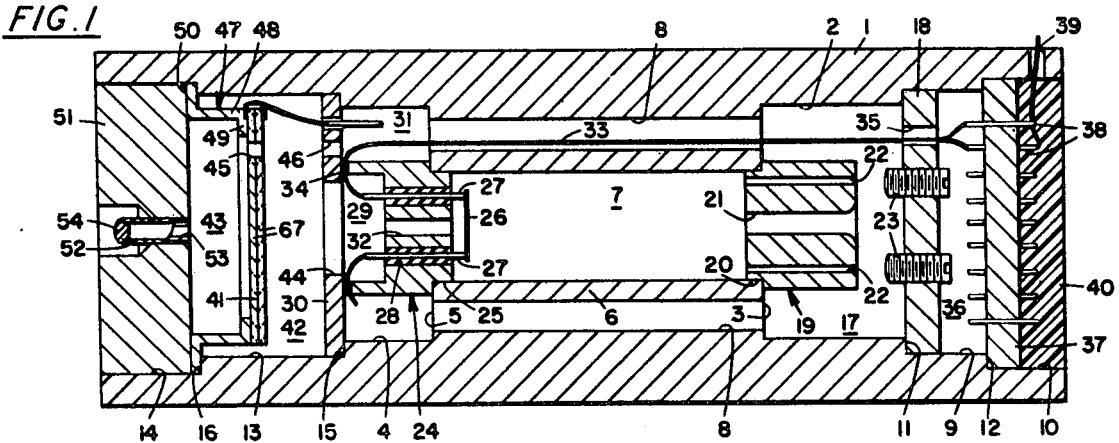
FIG.1
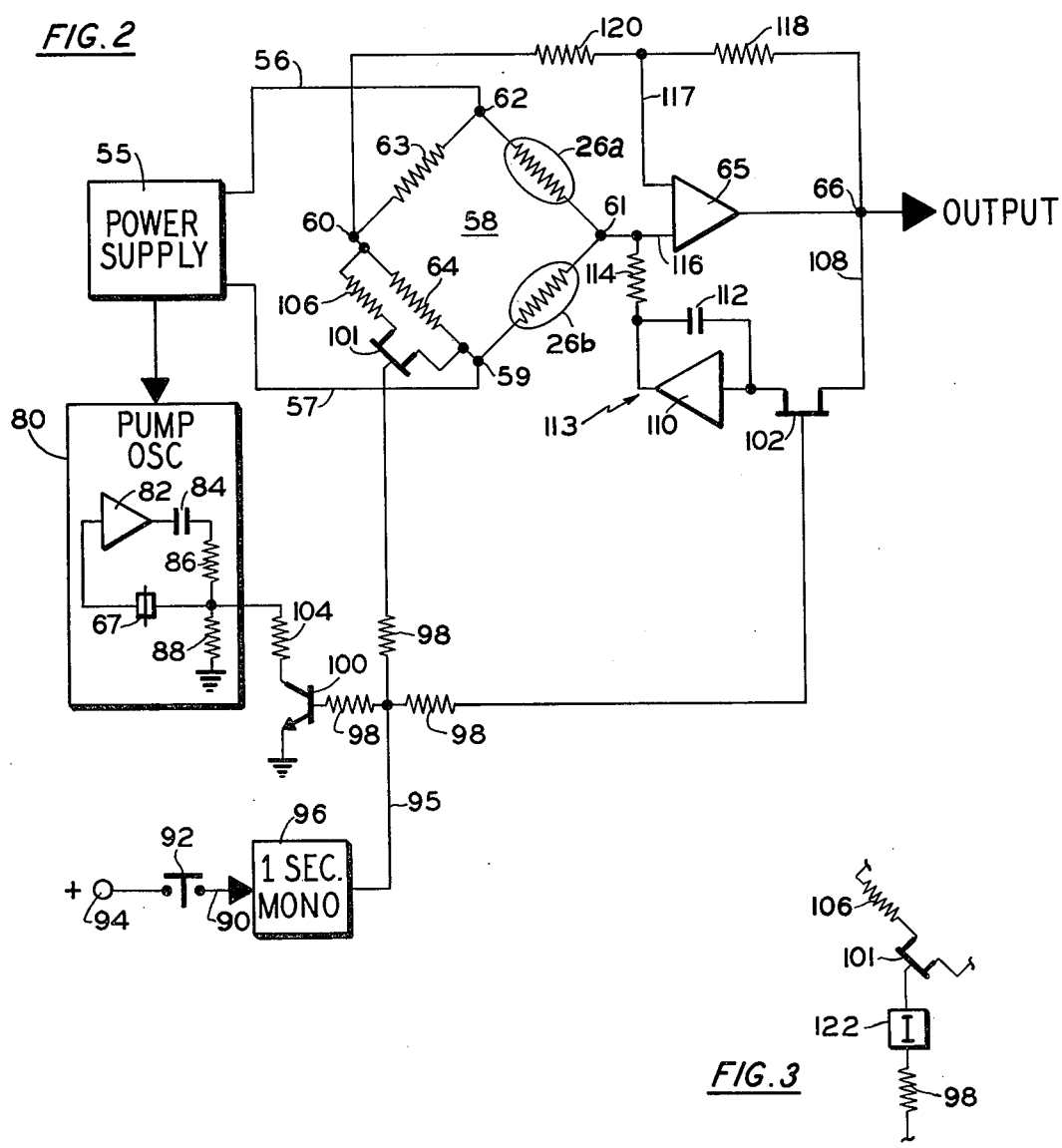
FIG.2
FIG.3

FLUIDIC ANGULAR RATE SENSOR NULL ERROR COMPENSATION

BACKGROUND OF THE INVENTION

1. Field of Invention

This invention relates to fluidic angular rate sensors, more particularly to apparatus for compensating dynamic null offsets.

2. Description of the Prior Art.

Of the fluidic angular rate sensors known in the art, perhaps the most widely used is the type illustrated in Schuemann U.S. Pat. No. 3,587,328, which comprises a self-contained unit including a piezoelectric diaphragm pump, and a fluid jet (or nozzle) through which a suitable fluid, such as an inert gas, is forced by the pump, thereby providing a charge or stream of gas directed toward a pair of temperature sensitive resistive elements which are differentially cooled by the jet whenever the jet is moved (such as in angular rotation) in a plane of sensitivity. The sensing elements are typically fine tungsten wires disposed on opposite sides of the center line of the nozzle boresight and perpendicular to the plane of sensitivity of the device. This device has found favor in many applications since it has no rotating parts, and substantially no moving parts (none except the vibrating diaphragm of the fluid pump).

One utilization of fluidic angular rate sensors (due to the lack of rotating parts) is in long storage life applications. In such cases, despite the care taken during manufacture and initial calibration, aging of the components and of the casing and other mechanical parts can easily cause changes in operating parameters which were initially adjusted for very accurate operation. The errors introduced in the rate sensor through aging can in turn create errors of a mission-failing magnitude in an overall system in which it is used.

SUMMARY OF THE INVENTION

An object of the present invention is to provide compensation for null offsets in fluidic angular rate sensors.

According to the present invention, the pump action driving the fluid jet in a fluidic angular rate sensor is reduced to a point below which it has any appreciable effect on the temperature-dependent sensing elements, and the output of the angular rate sensor is applied as integrated negative feedback to compensate for errors, the integrator thereafter being open-circuited so as to maintain the compensating offset voltage during the immediately ensuing operational use of the sensor. In further accord with the present invention, compensation is provided, such as to the sensing bridge of the fluidic angular sensor, to account for the difference in the null offset in static conditions (with the velocity of the jet severely reduced) in contrast with the dynamic null offset (when the device is fully operational, but with a zero angular rate), whereby the statically-determined null offset will be useful to compensate for the actual dynamic null offset, thereby enabling a static null offset compensation to in fact achieve a dynamic null offset compensation. In one embodiment, the pumping action that provides the fluidic jet to the temperature-dependent sensing elements is reduced substantially, but not entirely, so as to maintain some laminar flow of fluid in the device during the null-compensating static operation; in another embodiment, the pumping action may be completely eliminated, thereby to achieve a true static condition even during periods of extremely high angular rate inputs to the device.

The invention permits a fairly substantial compensation for null offsets which may not be present or apparent at the time of manufacturing calibration of a fluidic angular rate sensor, such as after an extremely long storage life.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a simplified, axial, sectioned side elevation view of a fluidic angular rate sensor of the type known to the prior art, in which the present invention may be incorporated; and FIG. 2 is a simplified schematic block diagram of the electronic sensing circuitry including null error compensation in accordance with the present invention.

FIG. 3 is a partial schematic diagram of a variation of the embodiment of FIG. 2.

DESCRIPTION OF THE PREFERRED EMBODIMENT

As an example of the environment in which the present invention may be used, consider a fluidic angular rate sensor of the type described in the aforementioned Schuemann U.S. Pat. No. 3,587,328, as shown in FIGS. 1 and 2. Therein, all of the reference numerals of FIGS. 1 and 2 of the Schuemann patent have been left for completeness, even though not referred to herein, since a simplified explanation of the operation of such a device will suffice herein.

In FIG. 1, a pump diaphragm 41, which may comprise a pair of A/C driven piezoelectric crystals 67, forces air out of a pump chamber 43, through a pump orifice 45 directly across an intake chamber 42 and through an outlet orifce 46, thereby to provide fluid under pressure, typically helium or some other inert gas, into fluid conduits or inlets 8, which communicate the fluid under pressure to a plenum chamber 17. The chamber 17 feeds the fluid to a nozzle 21 which directs a jet of the fluid through a jet chamber 7 past the temperature-dependent sensing elements 26, through exhaust ports 32 and into an exhaust chamber 29 for return to the intake chamber 42. As the jet travels from the nozzle 21 toward the sensor elements 26, any rotation of the apparatus in the plane of sensitivity (longitudinal, and perpendicular to the plane of the drawing) will not be reflected in the differential elements of the fluid which are already traversing the jet chamber 7, so that one or the other of the elements will appear more directly in the stream of the jet and the other one will be less directly in the stream, thereby providing a differential cooling effect on the sensing elements 26. The sensing elements 26 are resistances having a known coefficient of resistance as a function of temperature, and may preferably consist of fine tungsten wires gold-bonded to kovar posts 27. The sensing elements 26 are located as legs of a bridge circuit, as described with respect to FIG. 2 hereinafter, powered by a suitable power supply, such that the heating effect in the resistive sensing elements 26 by the power supply will cause the elements to assume a certain temperature above ambient (ambient is essentially the temperature of the gas stream), at which the elements have a certain resistance; differential cooling of the elements as a result of the jet action will correspondingly change the resistance thereof, providing a misbalance in the bridge which is sensed as an indication of the angular rate of rotation being undergone by the apparatus. All of this is known in the art and is described more fully in the aforementioned Schuemann patent.

The additional disclosure in the aforementioned Schuemann patent includes a sensing means having a bridge circuit in which the pair of sensing elements 26 are disposed along with a pair of reference resistors, in a well known fashion. The bridge is powered by a suitable power supply, and any misbalance in the bridge is amplified to provide an output from the sensing means which is a function of the angular rate being sensed. In the manufacture of such devices, it is common to provide matched pairs of sensing elements and matched pairs of reference resistors for the bridge, and to provide various other, normal caibration compensation such that the device will have a true zero output when it is sensing no angular rate, and such that its output will remain faithful over its design temperature range of operation (which may typically be −65° C to +125° C in military applications). However, one of the advantages of such a device is that it has no rotating parts, and no moving parts except the vibrating pump diaphragm. It is capable of being made in a form well suited to high quality hermetic sealing, and it therefore has potential for long storage life, reliable start up, and low cost (which may be desirable for use in large numbers of independent warheads of various types). At the time of manufacture, it is impossible to determine what effects the long storage life may have on the device, and therefore what inaccuracies may develop in the device over the period of time between its manufacturing calibration and its actual utilization.

According to the invention, a fluidic angular rate sensor is operated in a null offset compensation mode just prior to full operation for its intended mission, thereby to provide a substantial compensation for irregularities that may develop therein, to the extent that the irregularities cause the static null to be offset from zero one way or the other. At the time that such compensation is to be provided, it may be impossible to ensure that the angular rate sensor will have a zero angular rate input, and therefore it is necessary to provide dynamic null error compensation of the device by temporarily placing the device in a static mode (where it is insensitive to angular rate). This being the case, any difference in the null error in the dynamic mode (that is with the fluid jet flowing freely across the sensing elements) and the static mode (where there is a negligible flow of fluid across the sensing elements) must be taken into account, or the statically-determined null compensation will be erroneous, and may in fact be on the wrong side of the null so as to further compound the dynamic null error. As a first order of magnitude, it is assumed herein that the difference in the static null characteristics and the dynamic null characteristics of the device will be about the same at the time of manufacture as it will after a long storage life. Therefore, at the time of manufacture, the difference between the dynamic null error and the static null error can be determined, and when null error is found during the null compensation mode, this difference can be compensated for by a purposeful misbalancing of the sensing bridge by a commensurate amount, or by intentional introduction of some other compensating offset.

Thus the three functions which must be performed in order to utilize a statically-obtained null error compensation in a fluidic angular rate sensor are reduction of the jet stream below an amount where it has any significant effect on the sensing elements, provision of a compensation to the bridge or the bridge-responsive electronics so that the statically sensed null error will compensate for the dynamically sensed null error (an offset amount determined at the time of manufacturing calibration), and storing, and applying in negative feedback relationship, the offset error which is sensed in the static null error compensating mode, with the negative feedback continuing thereafter during dynamic operation in the intended mission.

Referring now to FIG. 2, in which the reference numerals used are the same or similar to those in the aforementioned Schuemann patent to the extent practical, the sensing elements 26a, 26b and the reference resistors 63, 64 are connected in a configuration to form a bridge 58, which is connected from terminals 59, 62 by leads 56, 57 to a power supply 55. The output of the bridge, taken from its terminals 60, 61, is connected to an amplifier 65 that provides a signal at an output 66 indicative of the angular rate being sensed.

The power supply 55 also supplies power to a pump oscillator circuit 80 that includes the piezoelectric crystals 67, which comprise the pump diaphragm 41 (FIG. 1), in the feedback path of an amplifier 82, thereby to drive the crystals 67 at their resonant frequency to cause the pump diaphragm 41 to oscillate and generate the fluid pumping action which provides the stream or jet of fluid for selective cooling of the sensing elements 26. The pump oscillator 80 may take a variety of forms, includingthe form illustrated in the aforementioned Schuemann patent. Or, as illustrated briefly in FIG. 2, it may include the amplifier 82, a capacitor 84 used to provide DC decoupling of the circuitry from the AC drive provided to the crystals 67, and a voltage divider including resistors 86 and 88, along with other components not shown herein for simplicity since these are well known in the art and their particular nature depends upon the particular circuitry utilized to implement the pump oscillator 80.

That portion of the circuitry FIG. 2 which has been described thus far is basically that known to the art. In accordance with the invention, a control signal on a line 90 (bottom of FIG. 2) is provided to initiate compensation of the null error, as described hereinbefore. The signal on the line 90 may be provided by a manual switch 92 connected to a suitable voltage source 94 (which may in face comprise some point in the power supply 55, or otherwise as may be desired). On the other hand, the signal on the line 90 may be a signal from an appropriate point in an overall mission-control apparatus which governs the operation of a mission in which the particular angular rate sensor is to be utilized, in which case the signal on the line 90 would just immediately precede the initiation of the mission itself. In other words, it is most desirable, for reasons described hereinafter, to provide the null compensation just before the angular rate sensor is to be used in a mission. The signal on the line 90 may be converted to a pulse on a line 95 of a desired duration, such as one second, by a suitable single shot or monostable multivibrator circuit 96, all as is well known in the art. This signal is fed, through isolation resistors 98 to three different electronic switches 100–102 which cause the three functions described hereinbefore which are required in accordance with the invention to provide for null error compensation. The switch 100, when actuated by the signal on the line 95, connects one end of a resistor 104 to ground, thereby causing this resistor to be in parallel with the resistor 88, so that the voltage fed back through the crystals 67 of pump diaphragm 41 can be reduced, such as to 20% of the normal operating voltage, thereby to sufficiently reduce the fluid flow in the device so as to render the sensing elements 26 insensitive to any angular rates which may be undergone during the null storage compensation operation. On the other hand, the resistor 104 could be a sufficiently small resistor so as to reduce the voltage applied to the crystals 67 to a point below which oscillation will not be sustained, thereby killing the pump action altogether, as described hereinbefore.

In order to ensure that the static null error compensation to be performed in accordance with the invention will operate as a sufficiently accurate compensation of the dynamic null error, the previously-determined difference between the dynamic null error and the static null error is compensated for by the electronic switch 101 which connects a relatively high resistance resistor 106 in parallel with one of the bridge reference resistors 64. This will in fact purposely misbalance the bridge 58 during the static null error compensation in such a fashion that the compensation actually provided will be that which is substantially equal to the compensation which will be necessary in the dynamic operational mode. Of course the dynamic null error cannot be compensated for in dynamic operation, since there is no way to tell what angular rate might be undergone at the time, so that any actual angular rate could not be accommodated in trying to compensate the null errors. On the other hand, the static compensation of null error might in fact be the wrong compensation and even on the wrong side of the null; by providing a purposeful misbalance of the bridge 58 during static operation so that the bridge would be providing essentially the same output that is expected in dynamic operation but with a zero angular rate, the static null will be adequate to substantially eliminate any changes in the system which result in a dynamic null error. Of course, to the extent there has been a change in the differential between static null error and dynamic null error over the storage life of the unit, then the invention cannot accommodate that change.

The actual null error compensation is provided by a negative feedback path 108 connected through the electronic switch 102 to the input of a feedback amplifier 110 which has a feedback capacitor 112, thereby providing an integrating amplifier or dynamic integrator circuit 113, the output of which is fed through a resistor 114 to one input 116 of the amplifier 65. The other input 117 to the amplifier 65 includes a bridge input through a gain-adjusting resistor 120 and a feedback resistor 118 from the output 66. Thus the amplifier 65 may have a high gain with negative feedback for stability, with a suitable gain adjustment between the resistors 114, 116, 120, as is well known in the art, to provide for the output of the amplifier 110 being able to drive the amplifier 65 to a complete null at the output 66. When the signal on the line 95 initiates the null error compensation, the electronic switch 102 will connect the output 66 to the input of the amplifier 110; the output of the amplifier 110 is initially zero, but will integrate through the feedback capacitor 112, thereby providing a changing input to the amplifier 65 until it eventually is nulled to zero voltage at its output 66 which fully compensates for static null errors at the input 117 with the misbalance provided by the resistor 106. With zero volts applied from the output 66 to the input of the amplifier 110, its output will remain constant as applied through the resistor 114 to the input of the amplifier 65. The magnitude of voltage thus stored in the feedback capacitor 112 is the amount required to fully compensate for the null error. At the end of the compensation period, when the signal on the line 95 disappears, the pump will resume full operation, the bridge will be restored to its regular configuration, and the feedback path 108 will be broken at the electronic switch 102. If the electronic switch 102 is a suitable field effect transistor having a very high "off" impedence (low leakage), the voltage at the input to the amplifier 110 will remain constant as driven by its feedback capacitor 112; in fact, the decay of voltage at the input to the amplifier 110 can be sufficiently slow so as to be immaterial to utilizations of the angular rate sensor which fall within one or two minutes (that is, short missions); if really long term operation is required after the generation of the null error compensating voltage in the integrator 113, then the circuit may be designed for substantially zero decay in the voltage at the input of the amplifier 110, such as by providing a relay with a fully open contact in place of the electronic switch 102, and by other methods which are known to those skilled in the art. In any event, when the loop becomes open circuited, the amplifier 110 maintains its output through the feedback capacitor 112, and this output, applied through the resistor 114, will supply a null offset error compensation input voltage to the amplifier 65 which should be fairly close to the dynamic null offset of the device.

In another embodiment, briefly illustrated in FIG. 3, the bridge is normally offset to render dynamic operation with a null error equal to that in static operation, due to an inverter 122 causing the switch 101 to be on except when the static null is stored in response to the signal on line 95.

Since the present invention relates to the overall combination of functions utilized to generate a null error compensation voltage in a fluidic angular rate sensor, and not to the particular details of circuitry which may be selected to perform those functions, the disclosure herein has purposefully been simplified with respect to the detailed electronic circuitry which may be used. However, it should be appreciated that all sorts of pump oscillators may be used, and that there are therefore a variety of forms which the particular pump-killing circuitry may take. Also, instead of purposely misbalancing the bridge by means of altering the total resistance across one of the legs as described herein, a voltage generated by a suitable voltage regulating system could be purposefully introduced into the bridge in a variety of fashions so as to cause a change in its output unrelated to the resistive balance of the bridge; or, the voltage could be applied directly to one or the other input of the amplifier 65, or the differential gain of the amplifier could be altered; various other compensation may be applied anywhere in the sensing means (bridge, amplifier, etc.). Further, there are a wide variety of electronic switch configurations which could be utilized in place of the electronic switch 102, and these would in part depend upon the detailed internal structure of the integrating amplifier 113, which (because of its well known nature) has been shown in simplified form herein. Similarly, although the invention has been shown and described with respect to preferred embodiments thereof, it should be understood by those skilled in the art that the foregoing and various other changes, omissions and additions in the form and detail thereof may be made therein and thereto without departing from the spirit and scope of the invention.

Having thus described typical embodiments of our invention, that which we claim as new and desire to secure by Letters Patents is:

1. In a fluidic angular rate sensor of the type having a pair of temperature-sensitive resistive elements disposed in the path of a stream of fluid provided by a jet, the fluid being pressurized by pumping means, sensing means including said temperature-sensitive resistive elements and a pair of reference resistors arranged in a bridge circuit feeding an amplifier to provide an output indicative of the angular rate being sensed as a function of misbalance of said bridge induced by differential cooling of the temperature-sensitive resistive elements due to variations in the relative direction of the stream of fluid as a result of angular rates undergone by the sensor, the improvement comprising:

first means associated with said pumping means for reducing the pumping action thereof to a point where the stream of fluid has a negligible cooling effect on said temperature-sensitive resistive elements at any angular rate, said means rendered operable in response to a selectively applied first input signal thereto;

second means associated with said sensing means and selectively operable in response to a second input signal applied thereto offsetting the output of said sensing means by an amount determined to equal the difference between the static null and the dynamic null of said sensor at the time of its manufacture and initial calibration;

third means associated with said amplifier for providing an integrated negative feedback signal from the output thereof to an input thereof, said means being selectively actuable by a third input signal applied thereto to integrate the output of said amplifier and provide an opposing input signal thereto until the integrated input signal is sufficient to drive the output of said amplifier to zero, said means when thereafter not actuated, maintaining the integrated signal over a time interval which is significant with respect to the expected time over which said sensor is to function with null error compensation; and selectively operable means for providing all three of said input signals.

2. The improvement according to claim 1 wherein said second means comprises means associated with the bridge of said sensing means for misbalancing said bridge.

3. The improvement according to claim 2 wherein said second means comprises the series combination of an additional resistor and an electronic switch, said series combination connected in parallel with one of said reference resistors in said bridge, said electronic switch responding to said input signal to connect said additional resistor in parallel with said one reference resistor.

4. The improvement according to claim 1 wherein said pumping means comprises a piezoelectric diaphragm operated within an oscillator circuit and wherein said first means comprises means for reducing the voltage applied to said piezoelectric diaphragm in said oscillator circuit.

5. The improvement according to claim 1 in which said third means comprises an additional amplifier with capacitive feedback thereto and an electronic switch, said electronic switch being selectively actuable by said input signal thereto to provide a low impedance path from the output of the amplifier of said sensing means to the input of said additional amplifier, and when not actuated by said input signal to provide a very high impedance at the input of said additional amplifier, the output of said additional amplifier being connected to the input of said sensing means amplifier.

6. The improvement according to claim 1 wherein said selectively operable means provides either said first and third input signals or said second input signal, alternatively.

7. The improvement according to claim 3 wherein said selectively operable means provides either said first and third input signals or said second input signal, alternatively.

8. The improvement according to claim 1 wherein said selectively operable means provides all three of said input signals simultaneously.

9. The improvement according to claim 3 wherein said selectively operable means provides all three of said input signals simultaneously.

* * * * *